US 6,739,078 B2

(12) United States Patent
Morley et al.

(10) Patent No.: US 6,739,078 B2
(45) Date of Patent: May 25, 2004

(54) MACHINE CONTROL OVER THE WEB

(75) Inventors: Richard E. Morley, Mason, NH (US); James Lajoie, Temple, NH (US); Jan W. Grondstra, Swampscott, MA (US)

(73) Assignee: R. Morley, Inc., Milford, NH (US)

( * ) Notice: Subject to any disclaimer, the term of this patent is extended or adjusted under 35 U.S.C. 154(b) by 33 days.

(21) Appl. No.: 10/216,056

(22) Filed: Aug. 9, 2002

(65) Prior Publication Data

US 2003/0036817 A1 Feb. 20, 2003

Related U.S. Application Data

(60) Provisional application No. 60/312,933, filed on Aug. 16, 2001.

(51) Int. Cl.[7] .............................. G02F 5/02; G05D 1/02; G05D 1/04
(52) U.S. Cl. ............................ 37/348; 37/414; 37/195; 701/50
(58) Field of Search .......................... 37/348, 414, 416, 37/382, 195; 701/50, 29, 23, 24, 30; 172/2

(56) References Cited

U.S. PATENT DOCUMENTS

| | | | | |
|---|---|---|---|---|
| 4,465,155 A | * | 8/1984 | Collins | 180/169 |
| 4,482,960 A | * | 11/1984 | Pryor | 701/28 |
| 4,829,418 A | * | 5/1989 | Nielsen et al. | 700/59 |
| 5,019,761 A | | 5/1991 | Kraft | |
| 5,237,888 A | | 8/1993 | McCombs | |
| 5,666,792 A | * | 9/1997 | Mullins | 56/10.2 A |
| 5,907,111 A | * | 5/1999 | Josten et al. | 73/866.5 |
| 6,024,145 A | * | 2/2000 | Ackles | 144/382 |
| 6,044,316 A | * | 3/2000 | Mullins | 701/50 |
| 6,144,910 A | * | 11/2000 | Scarlett et al. | 701/50 |
| 6,363,632 B1 | * | 4/2002 | Stentz et al. | 37/414 |
| 6,405,114 B1 | * | 6/2002 | Priestley et al. | 701/50 |
| 6,449,884 B1 | * | 9/2002 | Watanabe et al. | 37/348 |
| 6,493,616 B1 | * | 12/2002 | Rossow et al. | 701/29 |
| 6,611,740 B2 | * | 8/2003 | Lowrey et al. | 701/29 |
| 6,614,361 B1 | * | 9/2003 | Kinugawa | 340/870.16 |

FOREIGN PATENT DOCUMENTS

JP          4-202916          *   7/1997

* cited by examiner

*Primary Examiner*—Robert E. Pezzuto
*Assistant Examiner*—Thomas A. Beach
(74) *Attorney, Agent, or Firm*—Weingarten, Schurgin, Gagnebin & Lebovici LLP

(57) ABSTRACT

A system to control a piece of construction equipment or other piece of heavy equipment at a remote location via a data network in which a user provides movement instructions via a graphical user interface at a user PC to a programmable controller interfaced to the data network and the hydraulic movement systems of the heavy equipment. The graphical user interface includes a visual representation portion and a user control portion. A visual representation of the moveable elements of the heavy equipment is provided to the user via the graphical user interface, and the user inputs movement instructions via the user control portion of the graphical user interface.

60 Claims, 8 Drawing Sheets

MACHINE CONTROL OVER THE WEB

CROSS REFERENCE TO RELATED APPLICATIONS

The present application claims priority under 35 USC §119(e) of U.S. Provisional Application No. 60/312,933 titled Machine Control Over the Web, filed Aug. 16, 2001.

STATEMENT REGARDING FEDERALLY SPONSORED RESEARCH OR DEVELOPMENT

N/A

BACKGROUND OF THE INVENTION

The present invention relates to the remote control of heavy equipment over a data network such as the Internet and in particular to providing control signals for controlling one or more moveable elements of a piece of heavy equipment over the data network and providing a visual representation of the position of the moveable elements.

Construction projects require skilled operators to operate the necessary heavy equipment. Often, even in urban and suburban areas there may be a dearth of skilled heavy equipment operators. In addition, some projects may be located in remote locations that have few if any skilled heavy equipment operators and that may be inconvenient or dangerous for the human operators. This lack of skilled heavy equipment operators can lead to delays in construction projects, lost income to the construction companies and contractors, and increased costs to the consumer.

In some circumstances it may be possible to have a human operator control a piece of heavy equipment remotely. Safe remote operation of heavy equipment is typically accomplished by having the human operator control the heavy equipment within visual range by using a controller that is either hardwired into the controls of the heavy equipment or linked using radio frequency into the controls of the heavy equipment. However, current remote control systems use expensive high bandwidth data links that drive up the cost of these systems. In some instances, human operators are unable to be within visual distance of the heavy equipment and in these instances, the monitoring of the heavy equipment has required even larger bandwidth to allow visual images to be provided to the operator.

In other instances, the use of the heavy equipment may require logging of particular movements for the purposes of maintaining maintenance records or in keeping records of the amount and type of material moved by the heavy equipment.

Accordingly, it would be advantageous for a system that allows the remote operation of heavy equipment by an operator and includes a visual representation of the heavy equipment to allows the operator to monitor the position of the heavy equipment and provides for storage of the operational/movement data.

BRIEF SUMMARY OF THE INVENTION

A system to control a backhoe or other piece of heavy equipment at a remote location via a data network is disclosed in which movement instructions are generated by a user via a graphical user interface at a user PC, or generated autonomously by a computer programmed by the user. The movement instructions are provided via the data network to a programmable controller interfaced to the data network and the hydraulic movement systems of the heavy equipment. The graphical user interface includes a visual representation portion and a user control portion. A visual representation of the one or more moveable elements of the heavy equipment is provided to the user via the graphical user interface, and the user inputs real time movement instructions or programs a series of movement instructions via the user control portion of the graphical user interface or other programmable input.

In one embodiment, an apparatus for a user to remotely control a piece of heavy equipment such as a backhoe via a data network is disclosed. The backhoe includes a boom arm, a dipper arm, and a bucket each of which is controlled by a corresponding electrically controlled hydraulic movement system. The apparatus includes a user personal computer that has a graphical user interface that is operable to receive real time or programmed movement instructions from the user, or autonomous movement instructions generated by the user PC, remote PC, or a server, and to display a visual representation of the backhoe. The positioning of the various moveable elements in the visual representation of the backhoe is achieved using position data provided by a data generator. The user personal computer is coupled to the data network and transmits movement instructions over the data network. A remote personal computer coupled to the data network at a remote location receives the movement instructions from the data network. The remote personal computer is coupled to a first wireless modem and is able transmit the movement instructions to a second wireless modem that is coupled to a programmable controller. The programmable controller receives the real time or programmed movement instructions and translates these movement instructions into electrical control signals. These electrical control signals are routed and coupled to the one or more hydraulic movement systems that correspond to the one or more moveable elements identified in the movement instruction. In this way, the particular moveable element identified in the movement instruction is actuated and moved in the desired direction. A data generator coupled to the user personal computer provides position data corresponding to the movement instructions, wherein the visual representation of the moveable elements of the backhoe is updated using the position data.

Other features, aspects, and advantages of the present invention will be apparent from the Detailed Description of the Invention in conjunction with the drawing.

BRIEF DESCRIPTION OF THE DRAWINGS

The present invention will be more fully understood by reference to the following Detailed Description of the Invention in conjunction with the Drawings of which.

DETAILED DESCRIPTION OF THE INVENTION

U.S. Provisional Application No. 60/312,933 titled Machine Control Over the Web filed Aug. 16, 2001 is hereby incorporated by reference.

As used herein, a backhoe or other piece of heavy equipment includes one or more moveable elements such as boom arms, dipper arms, buckets, propulsion systems, braking systems, and steering systems. Some of these moveable elements are moveable in a single degree of freedom and some of the moveable elements are moveable in two or three degrees of freedom.

A system for controlling one or more moveable elements of a heavy machine such as a backhoe is disclosed. Movement instructions that are provided real time by a user, are preprogrammed by the user, or are generated by the user PC autonomously are transmitted by a user personal computer (PC) to a remote PC over a data network such as a LAN, WAN, Internet, Intranet, World Wide Web, wireless data network, local area repeater network, or other form of data transmission network having a bandwidth and connectivity sufficient to provide reliable communications between the user and the remote equipment. The remote PC interfaces to the data network, receives the movement instructions, and provides the movement instructions to a programmable controller. The programmable controller is coupled to a hydraulic movement system that controls the movement of the one or more moveable elements that correspond to the element identified in the movement instruction. A data generator provides position data for the one or more moveable elements in response to the user provided movement instructions. The position data are provided to the user PC and used to provide an accurate visual representation to the user via the graphical user interface of the positions of the moveable elements of the backhoe. This allows the user to view a visual representation, in real time, of the movements of the moveable elements of the backhoe.

In one embodiment, the data generator is an open loop system that includes a mathematical model that receives the movement instructions and is responsive thereto by calculating position data for each of the moveable elements. In another embodiment, the data generator is a closed loop system in which the position of each of the moveable elements is measured directly or indirectly in real time by one or more corresponding position sensors. The position data is provided to the graphical user interface and is used to properly display the positions of the moveable elements. In another embodiment, the data generator is primarily the open loop system described above but with measurement data provided periodically to update the positions of the moveable elements. In another embodiment, the data generator is a video camera to provide real time video images of the backhoe. These images are be provided across the data network and displayed in real time to the operator on the personal computer.

Although a backhoe is used throughout the illustrated embodiments as an exemplar, other types of heavy equipment that utilize electrically controllable hydraulic movement systems to control moveable elements such as bulldozers, logging equipment, farm equipment, graders, cranes, and the like could be similarly controlled.

Figure 1:
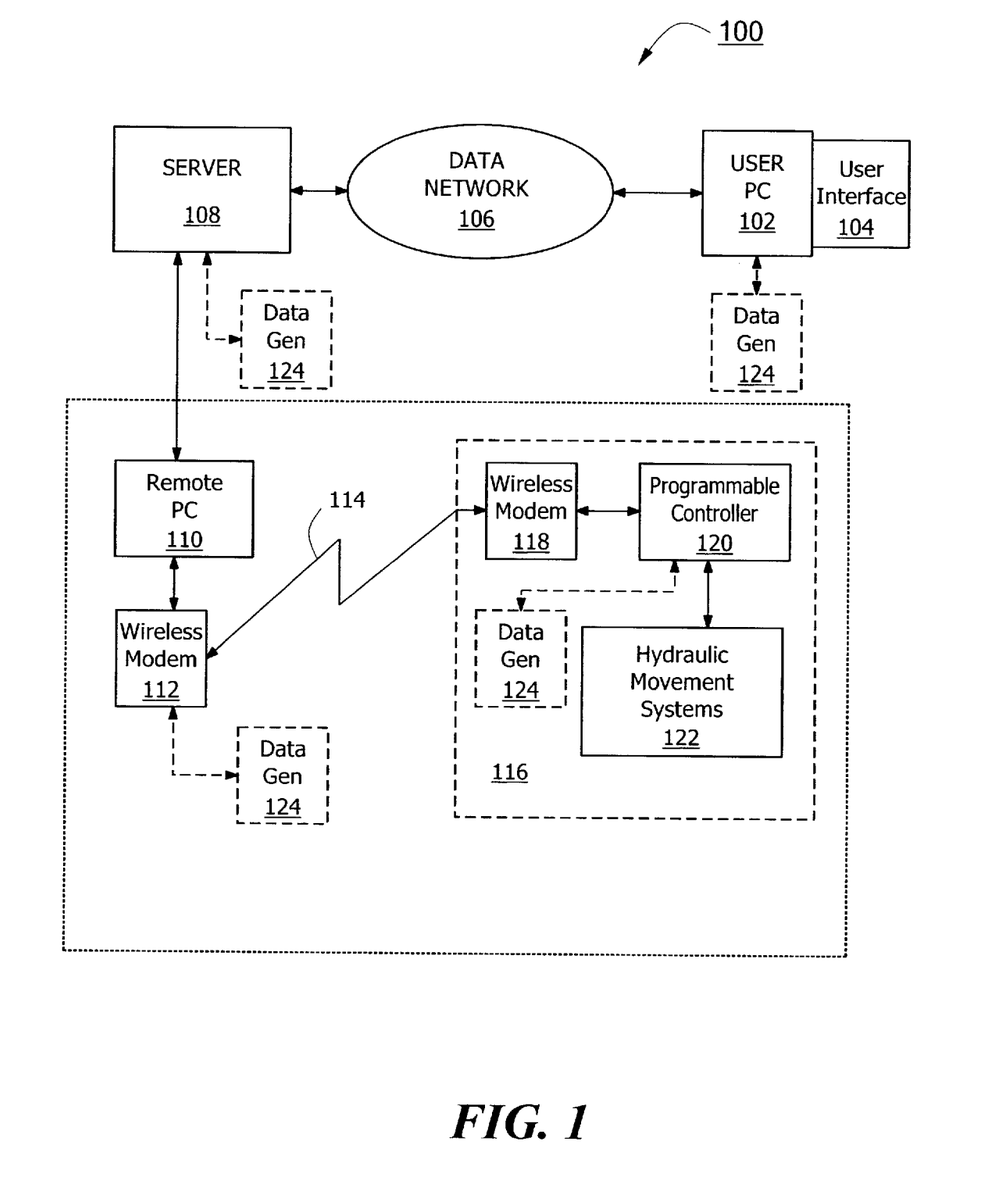
FIG. 1 is a block diagram of an embodiment apparatus for controlling a machine via a data network in accordance with the present invention.

FIG. 1 depicts a system 100 for controlling a backhoe 116 via a data network 106. A user PC 102 that includes a graphical user interface 104 is used to receive movement instructions from the user (not shown) and to provide a visual representations of the moveable elements of the backhoe to the user that are based on received position data. The user PC 102 is coupled to the data network 106 and is operative to send the movement instructions via the data network 106 to a remote server 108. A remote server 108 interfaces to the data network 106 and receives the movement instructions therefrom and is further coupled to a remote PC 110. In another embodiment, the remote PC 110 may be directly coupled to the data network 106. The remote PC 110 receives the movement instructions from the server 108, and is operable to store and forward the received instructions. To this end, the remote PC 110 is coupled to a first wireless modem 112 that is coupled by optical means or radio frequency means 114 to a second wireless modem 118. The first and second wireless modems are operable to transmit and receive between one another the movement instructions and other data generated by the various equipment. The second wireless modem 118, which is located in the backhoe 116, is coupled to a programmable controller 120. The programmable controller 120 receives the movement instructions via the wireless modem hookup and is operative to translate the movement instructions into electrical control signals. The programmable controller 120 is further operative to couple the electrical control signals to the hydraulic movement control system 122 corresponding to the moveable element designated in the movement instruction. Alternatively, the programmable controller 120 can be directly coupled to the data network 106 directly either via a hard-wire hookup or a wireless hook up. A data generator 124, which can be located at the user PC 102, the server 108, the remote PC 110, or the programmable interface 120 provides position data on the backhoe moveable elements to the user PC 102.

As will be explained in more detail below, the data generator 124 may be an open loop system in which the positions of the moveable elements are estimated using the movement instructions as an input to the estimator. Alternatively, the data generator 124 may be a closed loop system in which the positions of the controlled moveable elements are measured directly or indirectly. These measurements can be used directly to provide position data or are provided as input to a mathematical model to calculate the positions of the moveable elements along with other data. Alternatively, the measurements can be used periodically as update data and provided to the user PC to update the open loop data provided by the mathematical model. Advantageously, these embodiments do not require a high bandwidth data network to transfer the position data or the update data. Inexpensive low bandwidth data connections, e.g., dial up lines, and low bandwidth networks e.g., local area repeater networks across cellular telephones can be employed. Alternatively, one or more digital video cameras can be employed to provide real time digital images. In this embodiment either one or two data links may be used. If two data links are used a first low bandwidth data network can be used to provide transmission of the movement instructions, while a second higher bandwidth data network can be used to transfer the digital video images. Alternatively, a single data link can be used and if the bandwidth is insufficient for real time digital video transmission, the digital images may be low resolution and updated every few seconds. Higher bandwidth data links allow higher resolution images, faster periodic updates by measurement systems, and faster updates of the mathematical models used in visual display of the equipment.

Figure 2:
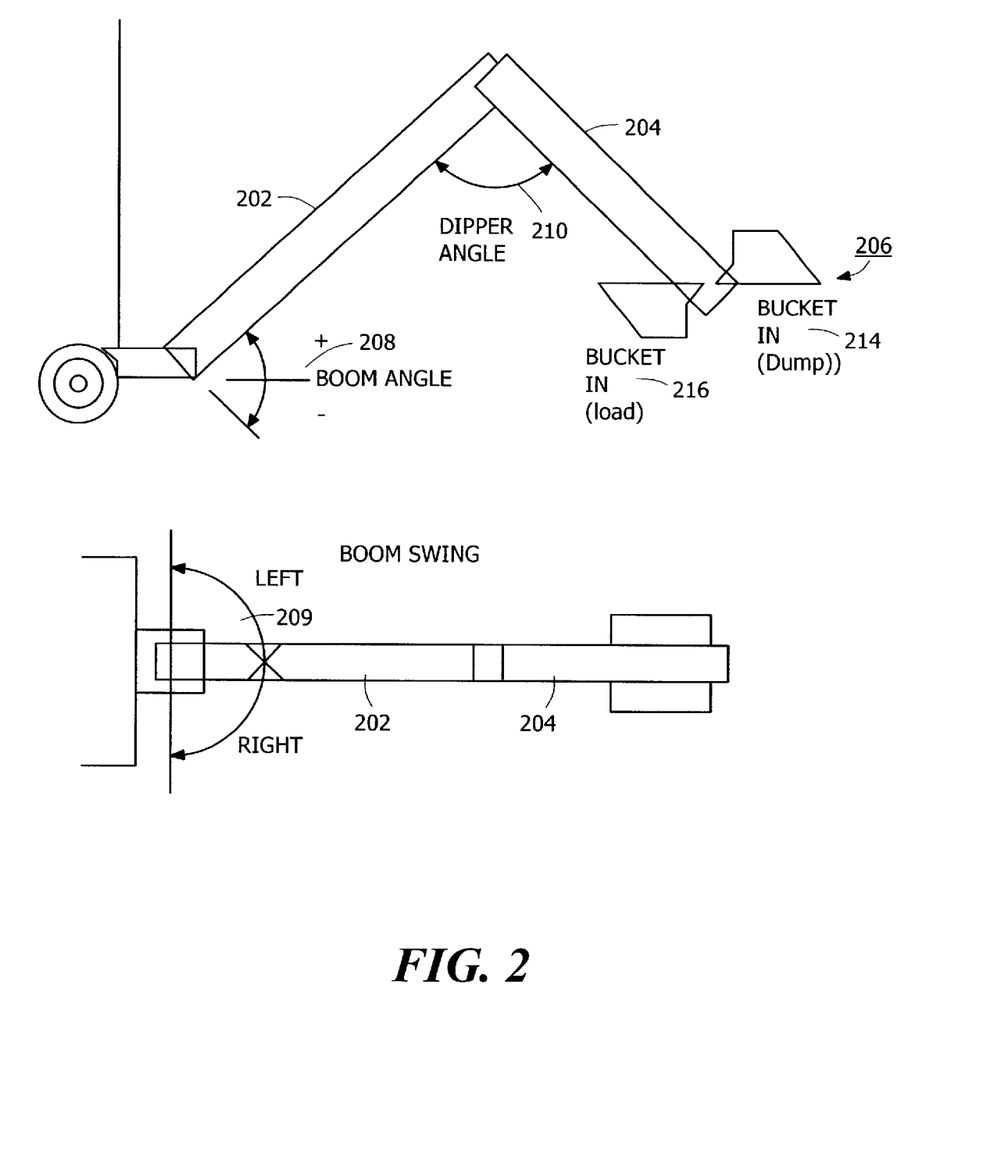
FIG. 2 is a schematic representation of the various movements that a backhoe is capable of in accordance with the present invention.

FIG. 2 depicts some of the controllable moveable elements of a typical backhoe used in the present invention. The positions of these moveable elements can be determined in terms of one or more angles of the elements relative to a predetermined origin and in terms of the length of the corresponding moveable element(s). Accordingly, in the illustrated embodiment, the positions of the moveable elements of the backhoe are controlled by adjusting one or more of the angles associated with each moveable element. The moveable elements of the backhoe used in the illustrated embodiment include a boom arm 202, a dipper arm 204, and a bucket 206. The boom arm is controlled in two dimensions by a boom angle 208 and a swing angle 209. The dipper arm is controlled in one dimension by dipper angle 210, and the bucket is controlled to be in either a dump (out) position 212 or a load position (in) position 214. Thus, material may be loaded, moved, and dumped anywhere within the range of the backhoe by controlling these three angles and the bucket position. It should be appreciated that other systems that are hydraulically controlled or could be adapted to hydraulic control could be controlled in the present invention. For example, steering, gas, and braking could all be controlled remotely allowing a backhoe to be positioned and operated entirely from a remote location.

Figure 3:
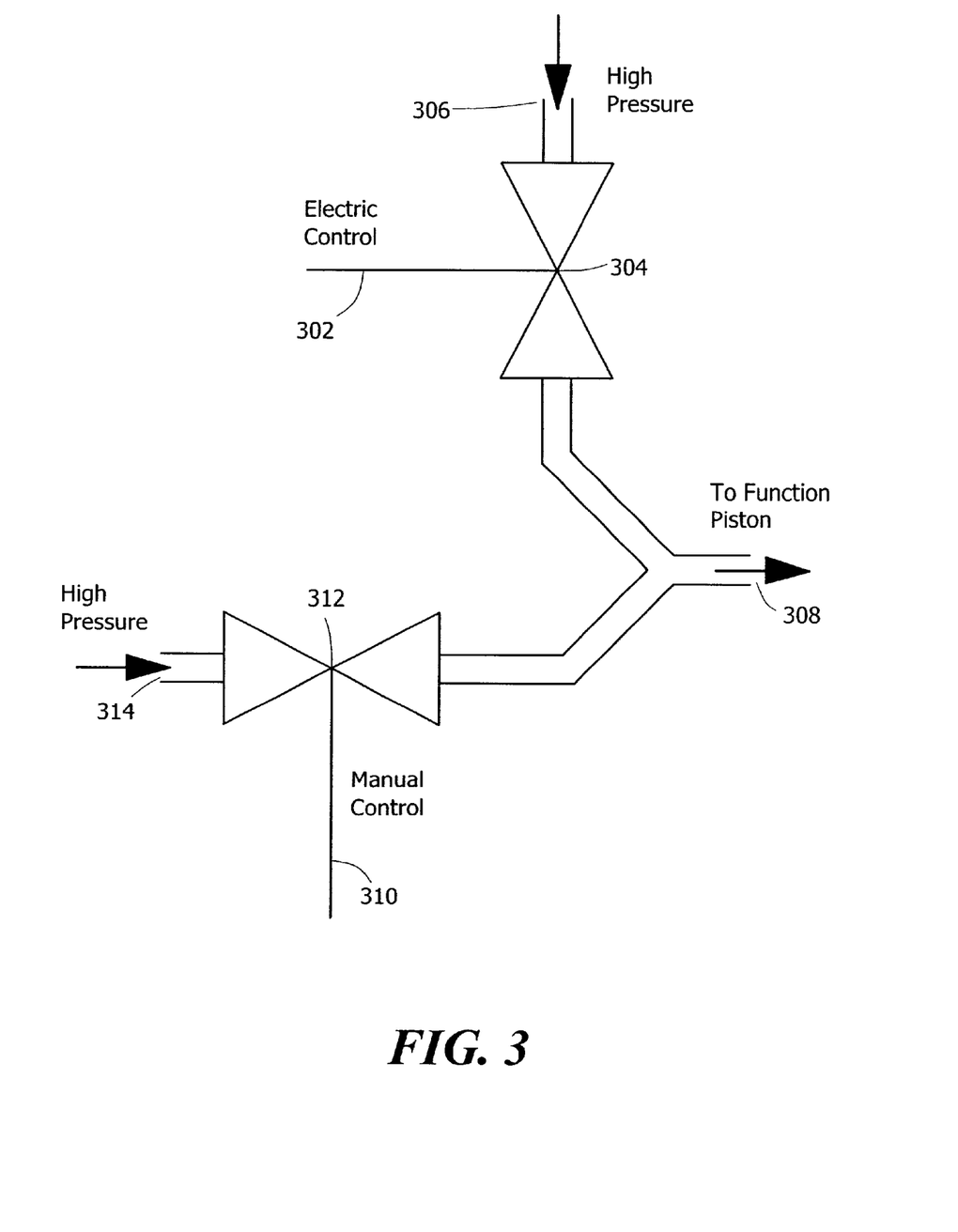
FIG. 3 is a schematic representation of a typical hydraulic valve in a hydraulic movement system.

In the illustrated embodiment, electrically controlled hydraulic valves such as the one depicted in FIG. 3 actuate the backhoe elements that are controlled via a data network 106. An electrical control signal 302 is provided to a hydraulic valve 304 that controls the flow of high-pressure hydraulic fluid 306 to and from a function piston 308. In the illustrated embodiment, a manual control signal can be provided via the backhoe manual controls in parallel to the electric control signals to control a second hydraulic valve 312 and the flow of high pressure hydraulic fluid 314 to and from the function piston 308. Thus, the backhoe is operable either in a remote control mode or in a local control mode.

Figure 4:
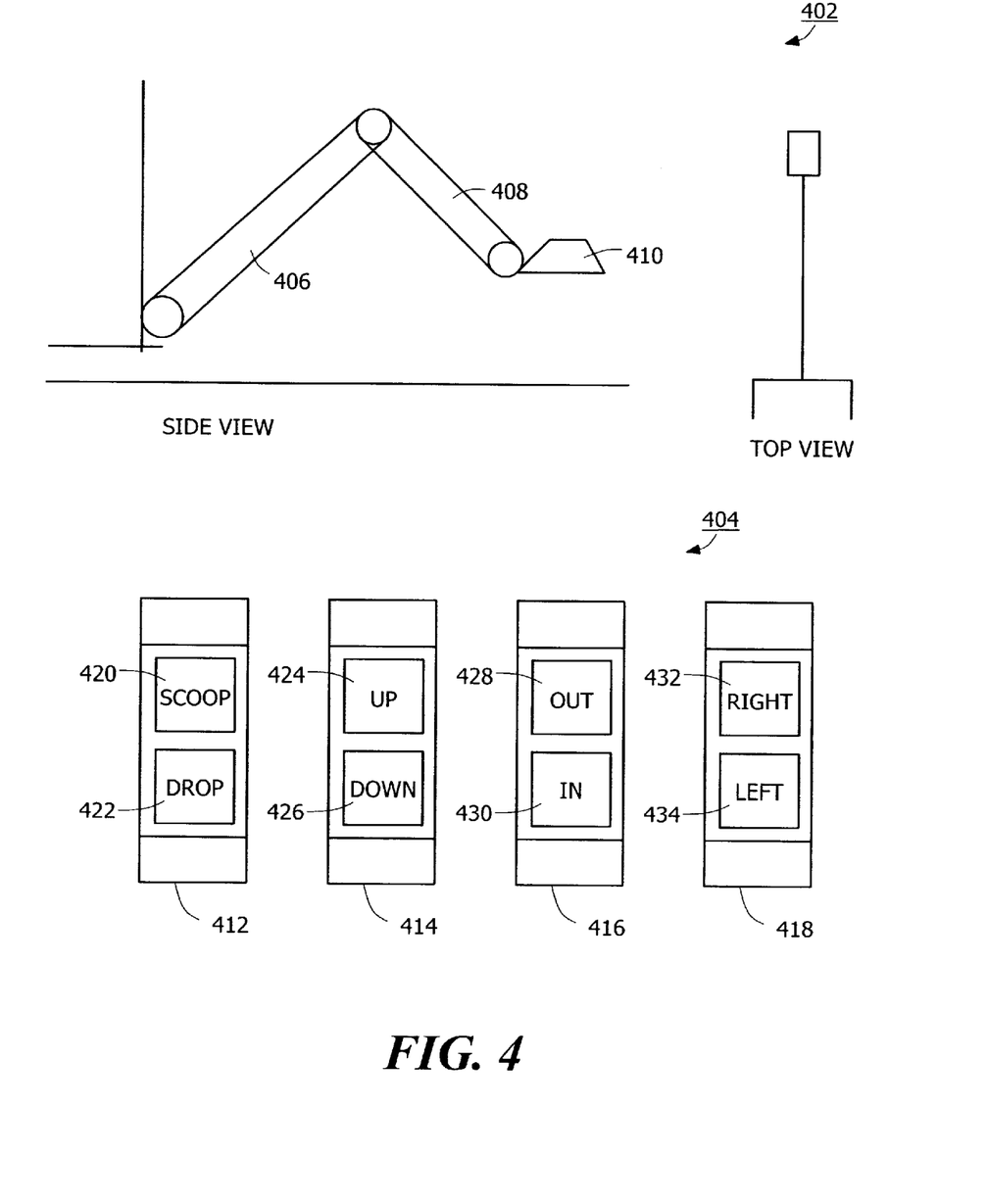
FIG. 4 is schematic representation of a graphical user interface used as the user command console in conjunction with the user personal computer depicted in FIG. 1.

The remote control interface provided to the user via user PC 102 is the graphical user interface 104. An embodiment of the graphical user interface 104 is depicted in FIG. 4 and includes a backhoe visual representation section 402 and a user control portion 404. The visual representation section 402 includes a side view and top view of the moveable elements of the backhoe 116. In particular, the side view includes a virtual boom arm 406 and corresponding boom arm angle, a virtual dipper arm 408 and corresponding dipper arm angle, and a virtual bucket 410 in a load (scoop) or dump (drop) position. The top view includes the boom arm and dipper arm and depicts the swing angle of the backhoe.

In the illustrated embodiment, the user control portion 404 of the graphical user interface 104 includes four virtual control switches. A first virtual control switch 412 controls the bucket position. A second virtual control switch 414 controls the boom arm angle. A third virtual control switch 416 controls the dipper arm angle, and a fourth virtual control switch 418 controls the swing angle of the boom. Each control switch includes first and second areas that are designated to move the corresponding moveable element in a one direction or another. For example in the illustrated embodiment, the first virtual control switch 412 includes first and second areas 420 and 422 designated to move the bucket to either the load or dump position respectively. The second virtual control switch 414 includes first and second areas 424 and 426 that are designated to adjust the boom arm angle in either a positive or a negative direction 420 and 422 respectively. The third virtual control switch 416 includes first and second areas 428 and 430 that are designated to adjust the dipper arm angle in either a positive or a negative direction, respectively. The fourth virtual control switch 418 includes first and second areas 432 and 434 that are designated to adjust the boom arm swing angle in either a left or right direction, respectively. During remote operation a user places the mouse symbol over the area corresponding to the desired moveable element and the desired movement direction and activates the appropriate button on the mouse. Thus for example to swing the boom arm to the right, the mouse symbol is placed over area 432 and the appropriate button on the mouse activated.

When the mouse button is clicked or otherwise activated in the appropriate area, the graphical user interface provides a signal as output that is operative as a movement instruction. This movement instruction is sent from the user PC 102 to the remote PC 110 via the data network 106 and server 108. The position of the moveable element is adjusted as discussed above with respect to FIGS. 1–3. Alternatively, the movement instructions can be either be a series of preprogrammed movement instructions generated by the operator and executed sequentially or in response to a feedback signal such as a time-stamp or a predetermined position, or be autonomously generated by the user PC, the server, or the remote PC coupled to the corresponding piece of heavy equipment. The autonomously generated movement instructions may be in response to a operational goal input by the user, or a feedback signal such as a time-stamp or a predetermined position. For example, a bulldozer may be instructed to plow a 100 yard path to a certain height or a backhoe may be instructed to dig a ditch a certain depth and a certain length. The equipment proceeds repetitively until it has accomplished the required goal by reaching the predetermined final position. In the case of the pre-programmed series of movement instructions and the autonomous generation of movement instructions, the operator is able to set up the equipment and allow the equipment to be autonomous for repetitive operations. In this way the operator can manage the overall goals for each of the plurality of pieces of equipment while substantially reducing the time required for operating any one piece of equipment.

As discussed above, the graphical user interface 104 includes a visual representation section 402. In order to accurately depict the position of the various backhoe elements in the visual representation portion 402 accurate position data must be provided to the graphical user interface 104. In the illustrated embodiment, a data generator 124 is used to provide the accurate position data necessary to ensure that the visual representation of the backhoe position is sufficiently accurate to ensure safe operation.

As discussed above, in one embodiment, the data generator 124 is an open loop estimator in which mathematical model of the moveable elements receives the movement instructions from the graphical user interface 104. The mathematical model uses the movement instructions and the initial conditions of the various moveable elements as inputs to compute the new positions of the boom arm, dipper arm, and bucket.

The data generator 124 can be located on either end of the data network 106. That is, the data generator 124 can be located at the user PC 102 on the user side of the data network 106 or may be coupled to the server 108, remote PC 112, or the programmable controller 120 on the backhoe side of the data network 106. In the embodiment in which the data generator 124 is coupled to the user PC 102, position data is provided directly to the user PC and the graphical user interface 102 and so does not cross the data network 106. Due to delays inherent in data networks in which data sent to the remote PC 104 and the backhoe 116 are delayed. It is possible therefore that the open loop estimator may provide untimely or inaccurate visual data of the positions of the various moveable elements. A closed loop form of this embodiment can be used in which communications are established from the backhoe to the user PC to indicate the reception, the start of execution and the completing of execution of movement instructions.

In another embodiment, the data generator 124 is placed proximate to the server 108, remote PC 110, or programmable controller 120. Movement instructions provided by the user PC 102 are received by the server 108 and remote PC 112 via the data network 106. The data generator 124 also receives these instructions and as discussed above, determines the position data. This position is provided to the remote PC 112 or the server 108 and via the data network 106 to the graphical user interface 104.

In another embodiment of the data generator 124, one or more position sensors that measure angular displacement can be placed on the boom arm to measure the swing angle and the boom angle. Position sensors can be placed on the dipper arm to measure the dipper arm angle, and also on the bucket to determine the bucket angle. Thus, the four sensors measure the angular position of each of the moveable elements of the backhoe. These measurements can be used to accurately position the virtual boom arm 406, the virtual dipper arm 408, and the virtual bucket 410 in the visual representation section 402 of graphical user interface 104. Alternatively, a mathematical model can receive the angular measurements from the position sensors in real time and, using appropriate angular and linear transformation matrices, determine the position of the boom arm, the dipper arm, and the bucket. This position data is then used to accurately position virtual boom arm 406, the virtual dipper arm 408, and the virtual bucket 410 in the visual representation section 402. Alternatively, the measurement data can be used to periodically update the positions calculated by the open loop mathematical model.

Figure 5:
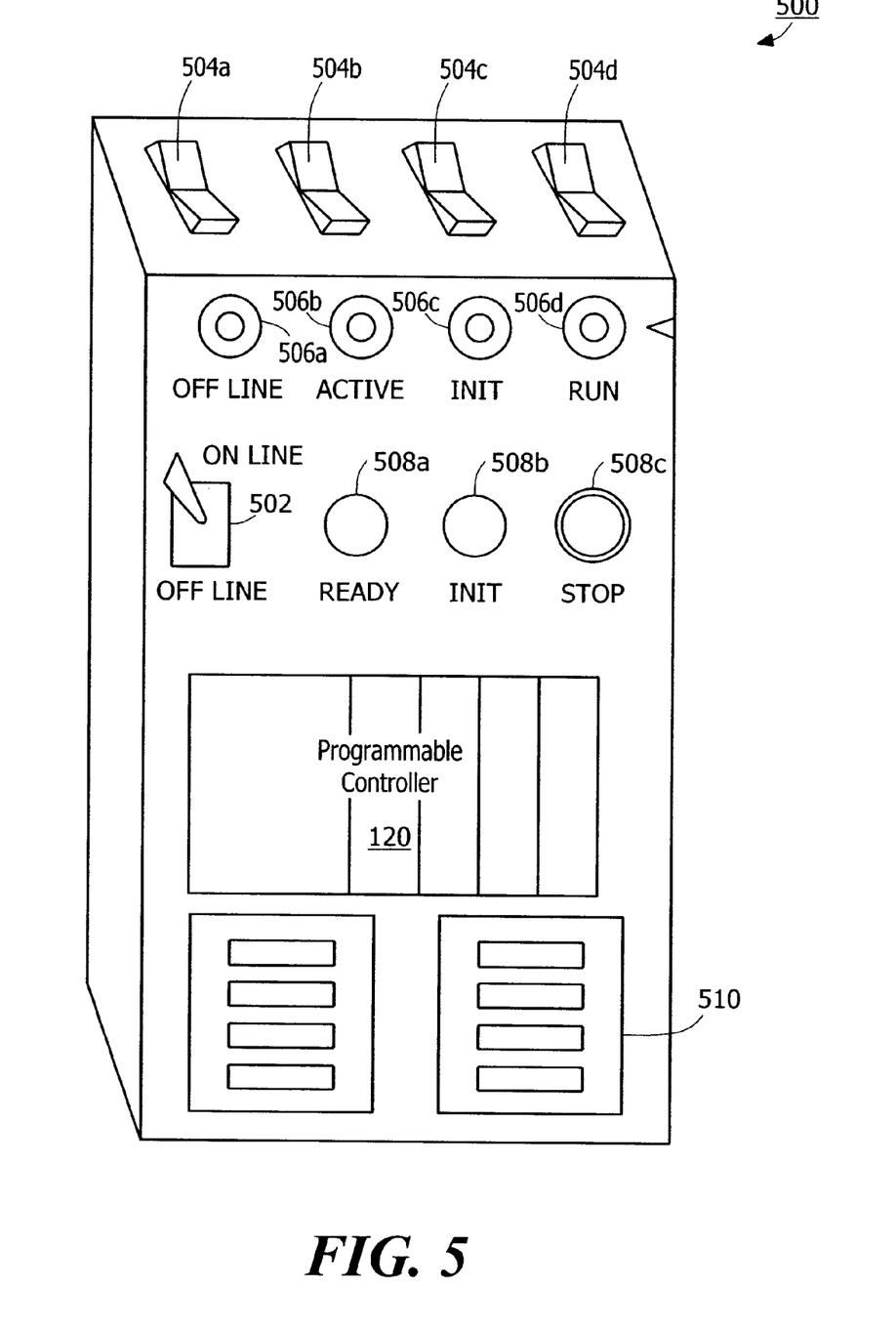
FIG. 5 is a front view of a control panel for the cab of the backhoe of FIG. 1.

FIG. 5 depicts a control panel that is suitable for use in the backhoe used in the present invention. FIG. 5 depicts a control panel 500 that includes an on-line/off-line switch 502 to select remote or local control of the backhoe. In addition, the control panel can include a plurality of switches 504a–d that can be used to control the backhoe components via the electrical interface provided by the remote control system, but this control is provided locally at the backhoe and not remotely. The control panel 500 can also include a plurality of visual indicators 506a–d that correspond to one or more operational states.

The plurality of switches 504a–d on the control panel 500 provide an electrical control signal to the corresponding hydraulic valve to actuate the associated moveable element. In the illustrated embodiment, switch 504a corresponds to the boom arm angle, switch 504b corresponds to the boom arm swing angle, switch 504c corresponds to the dipper arm angle, and switch 504d corresponds to the bucket.

The plurality of visual indicators 506a–d are used to provide indications of the operational state of the controller system. In the illustrated embodiment, indicator 506a indicates if the system is operating off-line or on-line. Indicator 506b indicates if the system is currently powered up and operational. Indicator 506c provides an indication of whether the backhoe is initializing the moveable elements to a predetermined initial state, and indicator 506d indicates if the system is currently running.

In addition, the control panel 500 may include other switches for remote operation. Switch 508a provides a system ready state in which the system is operable to receive movement commands. Switch 508b is operable to provide a system initialization state in which the system is initialized prior to remote operation. Switch 508c is a stop switch that is operable to provide a system stop signal to freeze the backhoe and the moveable components in a current configuration.

In addition, the control panel 500 can include the second wireless modem 118 and the programmable controller 120 combination receives and translates the movement instructions into electrical control signals. The output electrical control signals are coupled to the electrical relays 510 associated with the corresponding hydraulic movement system that can also be housed in the control panel 500.

Figure 6:
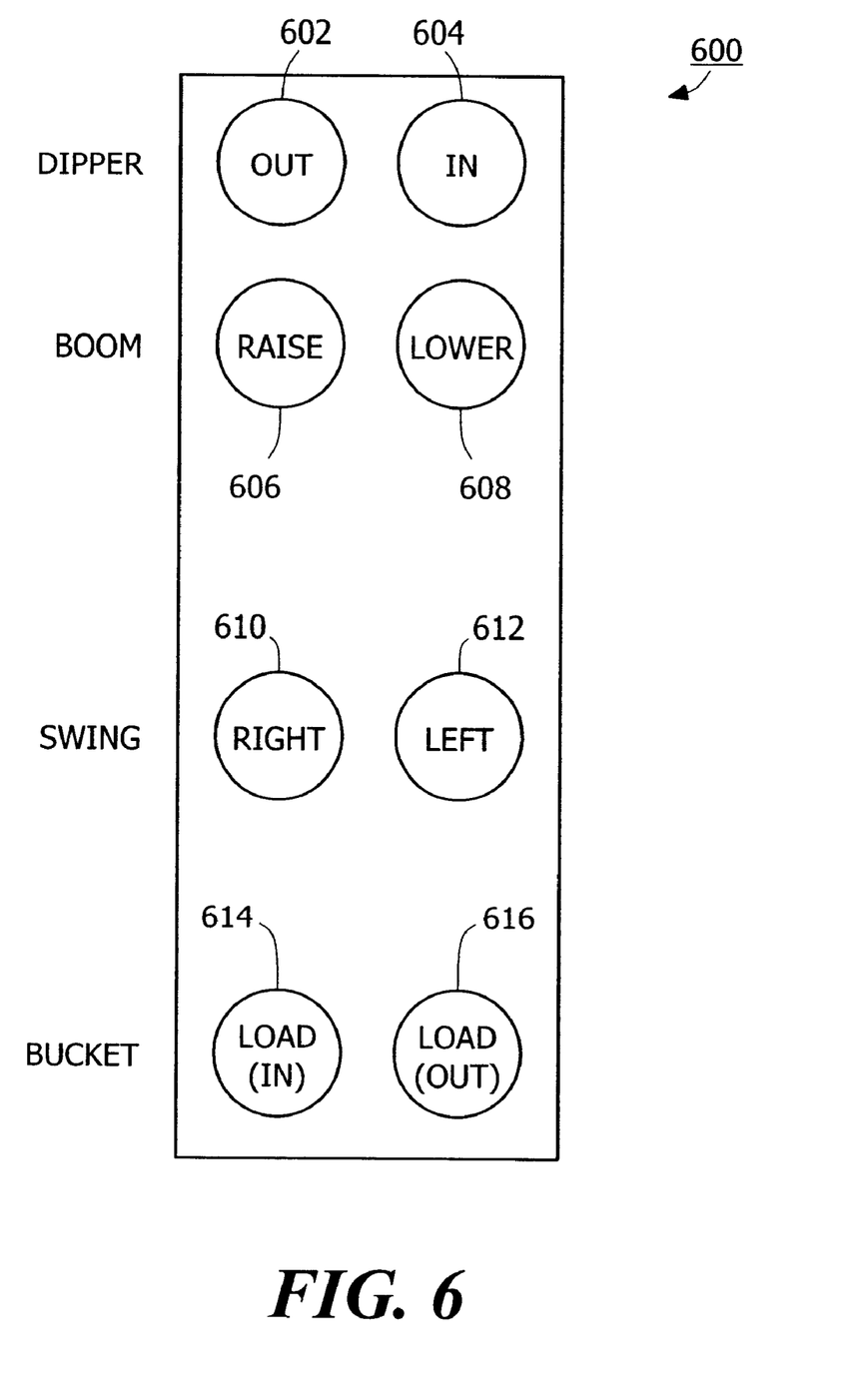
FIG. 6 is a schematic representation of a hydraulic signal panel located in the backhoe of FIG. 2 to indicate hydraulic system activation.

FIG. 6 depicts a hydraulics indicator panel 600 that is suitable for use with the present invention. The indicator panel 600 includes visual indicia indicating activation and the direction of movement of the corresponding hydraulic movement. In particular, visual indicia are provided for the boom arm raise and lower movements 602 and 604 respectively. Visual indicia are also provided for the dipper arm out and in movements 606 and 608 respectively, the swing angle right or left movements 610 and 612 respectively, and the bucket load or dump movements, 614 and 616 respectively.

Figure 7:
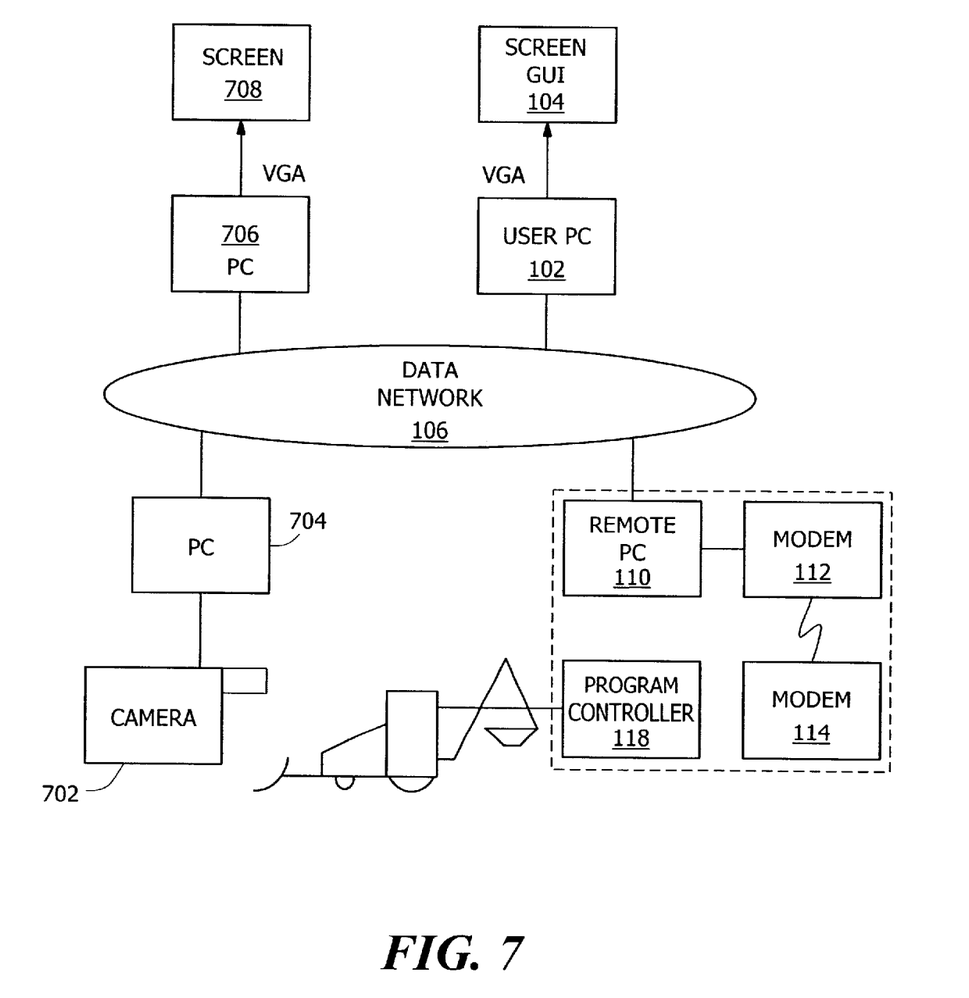
FIG. 7 is another embodiment of the apparatus for controlling a machine via a data network in accordance with the present invention.

FIG. 7 depicts another embodiment of the present invention in which a video camera provides real time video images to the user PC 102 via the data network 106. In particular the transmission and control of the backhoe via movement instructions sent the web occurs as explained above with respect to FIGS. 1–4. However, in this embodiment, the position data is in the form of real time video images provided by one or more digital video cameras 702. The one or more digital video cameras 702 provide real time digital video images to a PC 704, which may be a server, that is interfaced to the data network 106. A server or PC 706 at the user location receives the digital video images and displays these images on a high resolution screen, such as a VGA resolution monitor. The images may be displayed on the graphical user interface 104 of the user PC 102 or on another monitor to allow the images to be displayed on a full screen to provide a better image quality.

Figure 8:
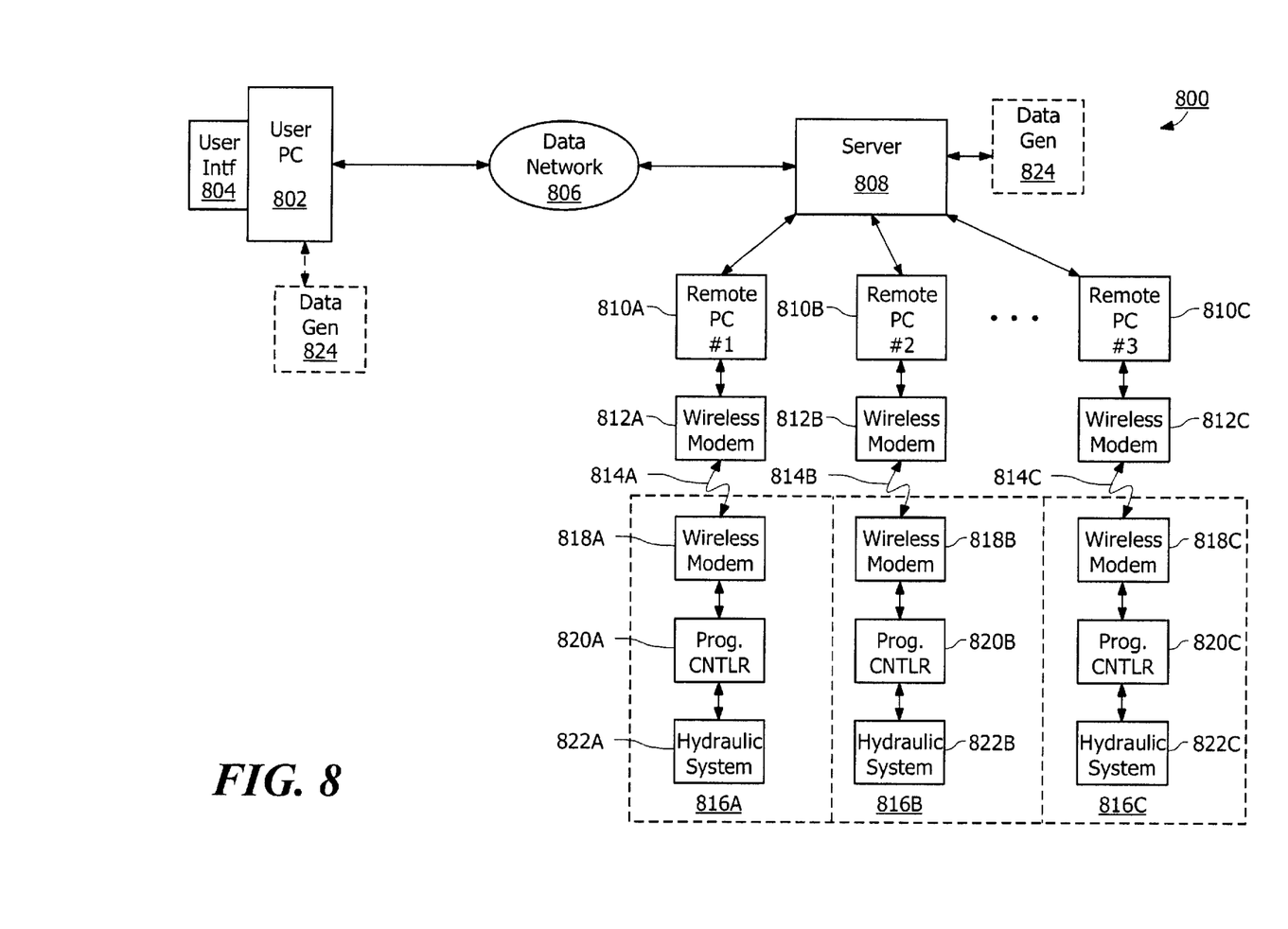
FIG. 8 is block diagram of an embodiment of an apparatus for controlling a plurality of machines via a data network in accordance with the present invention.

FIG. 8 depicts a system 800 for controlling a plurality of pieces of heavy equipment 816A–816C via a data network 806. A user PC 802 that includes a graphical user interface 804 is used to receive movement instructions from the user (not shown) and to provide a visual representations of the moveable elements of the plurality of pieces of heavy equipment to the user that are based on received position data. The user PC 802 is coupled to the data network 806 and is operative to send the movement instructions via the data network 806 to a remote server 808. The remote server 808 interfaces to the data network 806 and receives the movement instructions therefrom and is further coupled to a plurality of remote PCs 810A–C that correspond to the plurality of pieces of heavy equipment 816A–816C. In another embodiment, each of the plurality of remote PCs 810A–C may be directly coupled to the data network 806. Each of the plurality of remote PCs 810A–C receives movement instructions associated therewith from the server 808, and each is operable to store and forward the received instructions. To this end, each of the plurality of remote PCs 810A–C is coupled to a corresponding first wireless modem 812A–C that is coupled by optical means or radio frequency means 814A–C to a corresponding second wireless modem 818A–C. Each of the corresponding first and second wireless modems are operable to transmit and receive between one another the movement instructions and other data. Each of the plurality of second wireless modems 818A–C, which are located in the corresponding piece of heavy equipment 816A–C, is coupled to a corresponding programmable controller 820A–C. Each of the plurality of programmable controllers 820A–C receives the movement instructions via the wireless modem hookup and is operative to translate the movement instructions into electrical control signals. Each of the plurality of programmable controllers 820A–C is further operative to couple the electrical control signals to the corresponding hydraulic movement control system 822A–C corresponding to the moveable element designated in the movement instruction. Alternatively, each of the programmable controllers 820A–C can be directly coupled to the data network 106 directly either via a hard-wire hookup or a wireless hook up. A data generator 824, which can be located at the user PC 802, the server 808, or individually coupled (not shown) at each of the remote PCs 810A–C or the corresponding programmable controllers 820A–C provides position data on the backhoe moveable elements to the user PC 802.

As discussed above, the movement instructions can be either generated one at a time in real time by the operator, be a series of pre-programmed movement instructions generated by the operator and executed sequentially or in response to a feedback signal such as a time-stamp or a predetermined position, or be autonomously generated by the user PC, the server, or the remote PC coupled to the corresponding piece of heavy equipment. The autonomously generated movement instructions may be in response to a operational goal input by the user, a time-stamp, or a predetermined position. In the case of the pre-programmed series of movement instructions and the autonomous generation of movement instructions, the operator is able to set up the equipment and allow the equipment to be autonomous for repetitive operations. For example, a bulldozer may be instructed to plow a 100-yard path to a certain height or a backhoe may be instructed to dig a ditch a certain depth and a certain length. The equipment proceeds repetitively until it has accomplished the required goal. In this way the operator can manage the overall goals for each of the plurality of pieces of equipment while substantially reducing the time required for operating any one piece of equipment. Advantageously, this would allow a single operator to control the movement and operation of the multiple pieces of heavy equipment from a central location. Each of the individual pieces of heavy equipment could be located at separate construction sites allowing the single operator to be "virtually" present and operating a machine at more than one construction site simultaneously. In the illustrated embodiments discussed herein, the user PC 102 is an Advantech PPC-120 for the non-video embodiments, and an Advantech PPC-153 for the video embodiment. The remote PC 110 is an Advantech PPC-120. The first and second wireless modems are ADAM 4550 wireless modems, and the programmable controller is an ADAM 5000.

It will be appreciated by those of ordinary skill in the art that modifications to and variations of the above-described machine control apparatus over a data network may be made without departing from the inventive concepts disclosed herein. Accordingly, the invention should not be viewed as limited except by the scope and spirit of the appended claims.

What is claimed is:

1. An apparatus for a user to remotely controlling a backhoe across a data network, the backhoe including a boom arm, a dipper arm, and a bucket each being controlled by a corresponding electrically controlled hydraulic movement system, the apparatus comprising:

a user personal computer having a graphical user interface, the graphical user interface operable to receive movement instructions from the user and to display a visual representation of the backhoe in response to received position data, the user personal computer coupled to the data network and operable to transmit movement instructions over the data network and to receive position data;

first and second wireless modems capable of transmitting and receiving data over a wireless connection to one another;

a remote personal computer coupled to the data network and operable to receive movement instructions therefrom, the remote personal computer coupled to the first wireless modem and operable to transmit the movement instructions;

a programmable controller coupled to the second wireless modem and operable to receive the movement instructions, the programmable controller further operable to translate the received user instructions into electrical control signals, the programmable controller coupled to the boom arm, dipper arm, and bucket hydraulic movement control systems, wherein the electrical control signals are routed to the hydraulic movement control system corresponding to the movement instructions to provide for actuation of the corresponding hydraulic movement system; and a data generator coupled to the user personal computer, the data generator operable to provide position data corresponding to the movement instructions.

2. The apparatus of claim 1 wherein movement instructions include one from the group consisting of boom swivel left or right, boom up or down, dipper out or in, and bucket scoop or drop.

3. The apparatus of claim 1 wherein the visual representation of the backhoe is a schematic representation of the side view and a schematic representation of the top view of the backhoe.

4. The apparatus of claim 1 wherein the data generator is a mathematical model of the boom arm, dipper arm, and bucket in which the movement instructions are used as input and that provides position data as an output.

5. The apparatus of claim 4 wherein the data generator is included in the remote personal computer and the data generator provides the position data to the remote personal computer for transmission over the data network to the user personal computer.

6. The apparatus of claim 4 wherein the data generator is included in the user personal computer and provides position data thereto.

7. The apparatus of claim 1 further including a server coupled in series between the data network and the remote personal computer, wherein the data generator is included in the server and the data generator provides the position data to the server for transmission over the data network to the user personal computer.

8. The apparatus of claim 4 wherein the data generator is included in the programmable controller and the data generator provides the position data to the programmable controller for transmission to the user personal computer.

9. The apparatus of claim 1 wherein the data generator includes first, second, and third position sensors for sensing the boom position, the dipper position, and the bucket position respectively, the first, second, and third position sensors are coupled to the remote personal computer and provide measurement data thereto, the remote personal computer being operative to transmit the position data over the data network to the user personal computer.

10. The apparatus of claim 9 wherein the data generator is a mathematical model of the boom arm, dipper arm, and bucket in which the movement instructions are used as input and that provides position data as an output, and wherein the measurement data provided the by the first, second, and third position sensors is periodically provided to the user PC to update the position data provided by the mathematical model.

11. The apparatus of claim 1 wherein the data generator includes a video camera providing video images of the backhoe to the remote personal computer for transmission over the data network to the user personal computer, and wherein the visual representation of the backhoe is a video image displayed on the user personal computer.

12. The apparatus of claim 1 further comprising the programmable controller being coupled to a steering hydraulic movement system and a backhoe movement hydraulic movement system and providing electrical control signals thereto, wherein the backhoe may be moved by the application of appropriate control signals.

13. The apparatus of claim 1 wherein one of the group of the user PC, the remote PC, or the programmable controller autonomously generates one or more movement commands.

14. The apparatus of claim 13 wherein the autonomously generated movement commands are generated in response to a feedback signal.

15. The apparatus of claim 14 wherein the feedback signal is a predetermined time-stamp.

16. The apparatus of claim 14 wherein the feedback signal is a predetermined position.

17. The apparatus of claim 1 further including a server connected in series between the data network and the remote PC, and wherein the server generates one or more movement commands.

18. The apparatus of claim 17 wherein the autonomously generated movement commands are generated in response to a feedback signal.

19. The apparatus of claim 18 wherein the feedback signal is a predetermined time-stamp.

20. The apparatus of claim 18 wherein the feedback signal is a predetermined position.

21. The apparatus of claim 1 wherein the user personal computer is coupled to the data network using a low bandwidth connection.

22. The apparatus of claim 21 wherein the low bandwidth connection is a dial up line.

23. An apparatus for a user to remotely controlling a heavy equipment across a data network, the heavy equipment including one or more moveable elements being controlled by a corresponding electrically controlled hydraulic movement system, the apparatus comprising:

a user personal computer having a graphical user interface, the graphical user interface operable to receive movement instructions from the user and to display a visual representation of the heavy equipment in response to received position data, the user personal computer coupled to the data network and operable to transmit movement instructions over the data network and to receive position data;

first and second wireless modems capable of transmitting and receiving data over a wireless connection to one another;

a remote personal computer coupled to the data network and operable to receive movement instructions therefrom, the remote personal computer coupled to the first wireless modem and operable to transmit the movement instructions;

a programmable controller coupled to the second wireless modem and operable to receive the movement instructions, the programmable controller further operable to translate the received user instructions into electrical control signals, the programmable controller coupled to the one or more moveable elements hydraulic movement control systems, wherein the electrical control signals are routed to the hydraulic movement control system corresponding to the movement instructions to provide for actuation of the corresponding hydraulic movement system; and a data generator coupled to the user personal computer, the data generator operable to provide position data corresponding to the movement instructions.

24. The apparatus of claim 23 wherein the visual representation of the backhoe is a schematic representation of the side view and a schematic representation of the top view of the heavy equipment.

25. The apparatus of claim 23 wherein the data generator is a mathematical model of the one or more moveable elements in which the movement instructions are used as input and that provides position data as an output.

26. The apparatus of claim 23 wherein the data generator is included in the remote personal computer and the data generator provides the position data to the remote personal computer for transmission over the data network to the user personal computer.

27. The apparatus of claim 23 wherein the data generator is included in the user personal computer and provides position data thereto.

28. The apparatus of claim 23 further including a server coupled in series between the data network and the remote personal computer, wherein the data generator is included in the server and the data generator provides the position data to the server for transmission over the data network to the user personal computer.

29. The apparatus of claim 23 wherein the data generator is included in the programmable controller and the data generator provides the position data to the programmable controller for transmission to the user personal computer.

30. The apparatus of claim 23 wherein the data generator includes a plurality of position sensors for sensing the position of the one or more moveable elements and providing measurement data thereof, the plurality of position sensors being coupled to the remote personal computer and provide the measurement data thereto, the remote personal computer being operative to transmit the measurement data over the data network to the user personal computer.

31. The apparatus of claim 30 wherein the data generator is a mathematical model of the one or more moveable elements in which the movement instructions are used as input and that provides position data as an output, and wherein the measurement data provided the by plurality of position sensors is periodically provided to the user PC to update the position data provided by the mathematical model.

32. The apparatus of claim 23 wherein the data generator includes a video camera providing video images of the heavy equipment to the remote personal computer for transmission over the data network to the user personal computer, and wherein the visual representation of the heavy equipment is a video image displayed on the user personal computer.

33. The apparatus of claim 23 further comprising the programmable controller being coupled to a steering hydraulic movement system and an equipment movement hydraulic movement system and providing electrical control signals thereto, wherein the heavy equipment may be moved by the application of appropriate control signals.

34. The apparatus of claim 23 wherein one of the group of the user PC, the remote PC, or the programmable controller autonomously generates one or more movement commands.

35. The apparatus of claim 34 wherein the autonomously generated movement commands are generated in response to a feedback signal.

36. The apparatus of claim 35 wherein the feedback signal is a predetermined time-stamp.

37. The apparatus of claim 35 wherein the feedback signal is a predetermined position.

38. The apparatus of claim 23 further including a server connected in series between the data network and the remote PC, and wherein the server generates one or more movement commands.

39. The apparatus of claim 38 wherein the autonomously generated movement commands are generated in response to a feedback signal.

40. The apparatus of claim 39 wherein the feedback signal is a predetermined time-stamp.

41. The apparatus of claim 39 wherein the feedback signal is a predetermined position.

42. The apparatus of claim 23 wherein the user personal computer is coupled to the data network using a low bandwidth connection.

43. The apparatus of claim 23 wherein the low bandwidth connection is a dial up line.

44. An apparatus for controlling a plurality of pieces of heavy equipment at one or more remote locations from a user via a data network, the heavy equipment including one or more moveable elements being controlled by a corresponding electrically controlled hydraulic movement system, the apparatus comprising:
  a user personal computer having a graphical user interface, the graphical user interface operable to receive movement instructions from the user and to display a visual representation of the heavy equipment in response to received position data, the user personal computer coupled to the data network and operable to transmit movement instructions over the data network and to receive position data;
  a plurality of first and second wireless modems each of the first wireless modems corresponding to an associated one of the plurality of second modems forming a plurality of modem pairs, each of the plurality of modem pairs corresponding to one of the plurality of pieces of heavy equipment, each of the modem pairs capable of transmitting and receiving data over a wireless connection to one another;
  a remote personal computer coupled to the data network and operable to receive movement instructions therefrom, the remote personal computer coupled to the first wireless modem and operable to transmit the movement instructions;
  a programmable controller coupled to the second wireless modem and operable to receive the movement instructions, the programmable controller further operable to translate the received user instructions into electrical control signals, the programmable controller coupled to the one or more moveable elements hydraulic movement control systems, wherein the electrical control signals are routed to the hydraulic movement control system corresponding to the movement instructions to provide for actuation of the corresponding hydraulic movement system; and
  a data generator coupled to the user personal computer, the data generator operable to provide position data corresponding to the movement instructions.

45. The apparatus of claim 44 wherein the visual representation of the backhoe is a schematic representation of the side view and a schematic representation of the top view of the heavy equipment.

46. The apparatus of claim 44 wherein the data generator is a mathematical model of the one or more moveable elements in which the movement instructions are used as input and that provides position data as an output.

47. The apparatus of claim 44 further including a server coupled in series between the data network and each of the plurality of remote personal computers, wherein the data generator is included in the server and the data generator provides the position data to the server for transmission over the data network to the user personal computer.

48. The apparatus of claim 44 wherein the data generator includes a plurality of position sensors corresponding to each of the plurality of heavy equipment for sensing the position of the one or more moveable elements of the corresponding piece of heavy equipment and providing measurement data thereof, the plurality of position sensors being coupled to the corresponding remote personal computer and provide the measurement data thereto, the corresponding remote personal computer being operative to transmit the measurement data over the data network to the user personal computer.

49. The apparatus of claim 48 wherein the data generator is a mathematical model of the one or more moveable elements corresponding to each of the plurality of pieces of heavy equipment in which the movement instructions are used as input and that provides position data as an output, and wherein the measurement data provided the by plurality of position sensors is periodically provided to the user PC to update the position data provided by the mathematical model.

50. The apparatus of claim 44 wherein the data generator includes a video camera providing video images of the heavy equipment to the remote personal computer for transmission over the data network to the user personal computer, and wherein the visual representation of the heavy equipment is a video image displayed on the user personal computer.

51. The apparatus of claim 44 wherein one of the group of the user PC, each of the plurality of remote PCs, or the programmable controller autonomously generates one or more movement commands for one or more pieces of heavy equipment.

52. The apparatus of claim 51 wherein the autonomously generated movement commands are generated in response to a feedback signal.

53. The apparatus of claim 51 wherein the feedback signal is a predetermined time-stamp.

54. The apparatus of claim 51 wherein the feedback signal is a predetermined position.

55. The apparatus of claim 44 further including a server connected in series between the data network and the plurality of remote PCs, and wherein the server generates one or more movement commands for one or more of the pieces of heavy equipment.

56. The apparatus of claim 55 wherein the autonomously generated movement commands are generated in response to a feedback signal.

57. The apparatus of claim 56 wherein the feedback signal is a predetermined time-stamp.

58. The apparatus of claim 56 wherein the feedback signal is a predetermined position.

59. The apparatus of claim 44 wherein the user personal computer is coupled to the data network using a low bandwidth connection.

60. The apparatus of claim 44 wherein the low bandwidth connection is a dial up line.

* * * * *